May 18, 1926.
F. BALINT
1,585,227
AUTO SIGNALING DEVICE
Filed March 17, 1924
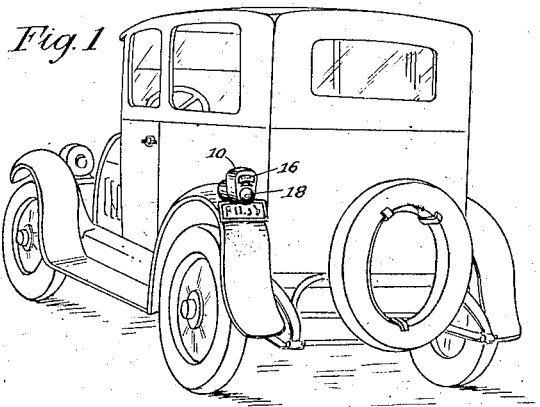
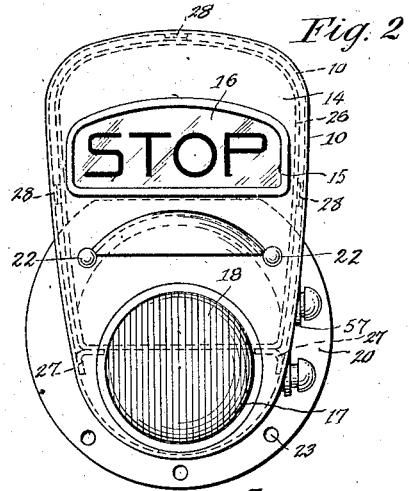
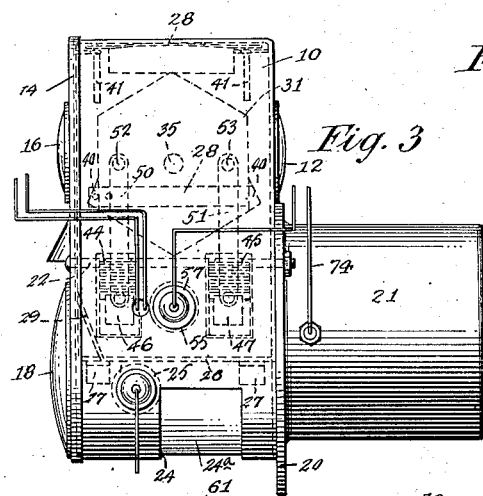
INVENTOR
Frank Balint
BY
Chamberlain & Newman
ATTORNEYS Patented May 18, 1926.

1,585,227

UNITED STATES PATENT OFFICE.

FRANK BALINT, OF BRIDGEPORT, CONNECTICUT.

AUTO SIGNALING DEVICE.

Application filed March 17, 1924. Serial No. 699,741.

This invention relates to an improved signal device for use on automobiles, and has for an object to provide a device of this character which will indicate to drivers of oncoming vehicles, either at the front or the rear, any change in direction or stoppage contemplated by the driver.

A further object is to provide a signal device which will produce both an audible and a visible signal, for indicating either "stop", "right", or "left", so that the attention of the drivers of the oncoming vehicles will be immediately and positively drawn to the signal.

A still further object is to provide a signal device in which a tail light is embodied in a convenient manner to be mounted on the rear fender of the automobile, in such relation to the number plate as to clearly illuminate it.

With the above and other objects in view, an embodiment of the invention is shown in the accompanying drawings, and this embodiment will be hereinafter more fully described with reference thereto, and the invention will be finally pointed out in the claims, In the drawings:

Fig. 1 is a perspective view of an automobile, equipped with a signal device, according to the present embodiment of the invention;

Fig. 2 is a rear elevation of the signal device;—

Fig. 3 is a side elevation thereof;

Fig. 4 is a rear view of the same, with the rear cover plate removed; and

Fig. 5 is a vertical sectional view, taken along the line 5—5 of Fig. 4, and showing the operating switches and wiring diagrammatically.

Similar reference characters indicate corresponding parts, throughout the several figures of the drawings.

Referring to the drawings, the embodiment of the invention shown therein comprises a vertically elongated casing 10, open at its rear side, and provided in the upper portion of its front side with an elongated opening 11, having a glass lens 12 inserted and held therein, and provided in the lower portion with a circular aperture 13, (Figs. 4 and 5) concentric to the horn diaphragm, presently more fully referred to. At the rear open side the casing is provided with a flanged cover plate 14, provided in its upper portion with an elongated opening 15, corresponding in shape and position to the opening 11, and having a glass lens 16 inserted and held therein, and in the lower portion there is provided a circular opening 17, having a tail light bull's-eye 18 inserted and held therein. A hooded opening 19 is provided between the openings 15 and 17 for permitting the sound from the horn to be more clearly carried out of the casing. The cover plate is secured to the casing, and the latter secured to the flange 20 of the horn 21, by tie rods 22 extending therethrough.

The device may be mounted on the automobile fender in conjunction with the number plate, as shown for instance in Fig. 1, in any suitable manner, and preferably by means of a bracket clamped to the horn flange 20, which is provided with holes 23 for this purpose.

In the lower end of the casing 10 there is provided an elongated rectangular light aperture 24, covered by a piece of transparent material 24ª, as mica, and an electric tail lamp 25 is mounted in the lower portion of the casing in position to illuminate the bull's-eye 18, and also the number plate through the opening 24.

The stop and right and left signal mechanism is mounted in a frame 26, supported in the casing 10 upon lugs 27 secured to the side walls of the casing and engaging the base of the frame, bowed leaf-spring members 28 being secured at the top and sides of the frame for engagement with the walls of the casing to securely support the frame, and at the same time permit of its sliding insertion into the casing, before securing of the cover plate 14 in place. The front and rear sides of the frame are open, and its base forms a partition between the tail-light compartment and the signal mechanism compartment. Inasmuch as the bull's-eye 18 extends above the base of the frame, an inwardly diverging shield 29 is secured about the upper edge of the bull's-eye and has its lower edge extending into a cut-out portion 30 in said base, so that light from the tail-light will illuminate the whole of the bull's-eye, and it will at the same time be shielded from the signal compartment.

In the upper portion of the frame there is revolubly mounted a hexagonal drum or signal carrier 31, adapted to have two of its parallel vertical faces disposed behind the lenses 12 and 16 and visible therethrough. One end 32 of the drum is solid, while the other end is in the form of a spider 33 having its tenon ends 34 engaged in cut-outs in the ends of the drum faces, a shaft 35 extending axially through the ends and being positioned in a manner to retain the spider in place by nuts 36 screwed upon the threaded ends of the shaft. The ends of the shaft are pointed, as at 37, and rotatably engaged in bearings 38 in the side walls of the frame.

As shown in Fig. 4, the vertical rear face of the drum has the word "Stop" thereon, while the upper and lower inclined faces have "right" and "left" signal arrows painted thereon, and at the front side the vertical face is also painted with the word "Stop", while the upper and lower inclined faces have "left" and "right" arrows.

A weight 39 is secured in the lower half of the drum upon the end wall 32 to normally balance and maintain the drum in its position with the "stop" faces in place behind the lenses 12 and 16, and adjacent the spider end 33, weighted lugs 40 are provided at the lower edges of the "stop" faces, which supplement the weight 39 to balance the drum, and also limit the rotation of the drum in either direction to bring the arrow faces into view by abutment against stop screws 41 secured in the upper end of the frame.

In the lower portion of the frame there are secured upon one side wall a pair of brackets 42 and 43 supporting electro-magnets 44 and 45, beneath which armature levers 46 and 47 are pivotally supported in suitable bearing portions 48 and 49 of the brackets. At their ends the armature levers are connected by links 50 and 51 to diametrically opposed pivot pins 52 and 53 provided in the spider end 33 of the drum. Obviously energization of the magnet 44 will rotate the drum in clockwise direction to the dotted line position (Fig. 5) to bring the "left" arrows into place behind the lenses 12 and 16, while energization of the magnet 45 will cause the drum to be rotated in counter-clockwise direction to bring the "right" arrows into view.

Normally the interior of the signal compartment is dark, and in order to illuminate it, when it is desired to signal, a lamp 54 is mounted below the drum in a socket 55 extended through an opening 56 in the frame and removably secured in a support 57 provided in the casing 10, this lamp being adapted to be lighted, without energization of the magnets, when it is desired to signal "stop", and to be lighted during the energization of the magnets when the "right" and "left" signals are operated. Just prior to each visible signal, the horn 21 is sounded to draw attention thereto by switch means presently to be described.

The switch and wiring arrangement preferably used with my improved signal device is shown diagrammatically in Fig. 5, and includes a switch device connected to the foot brake to be operated thereby to actuate the "stop" signal, and another switch device mounted on the dash or steering wheel and adapted to be operated to actuate the "right" and "left" signals.

The brake switch consists of a pivoted lever 58 normally held against a stop 59 by means of a spring 60, and adapted to be moved by a wire 61 upon application of the brake to contact first with a horn contact 62 and the battery contact 63, and thereafter with the signal light contact 64 and said battery contact. The dash switch consists of a pivoted lever 65 adapted to contact, upon being moved in one direction, with a horn contact 66, and a battery contact 67, a light contact 68, and a left signal contact 69, the horn contact being first engaged, and the light contact being engaged before and also during the engagement with the signal contact. In the other direction of movement, the lever is engaged with a horn contact 70, and a battery contact 71, a light contact 72, and a "right" signal contact 73, these being disposed in similar arrangement to the contacts at the left. It is understood that the battery is grounded at one side, and also the horn 21, light 54 and electro-magnets 44 and 45. The horn is connected by a lead 74 to the horn contact 62, and by a lead 75 to the horn contacts 66 and 70. The light 54 is connected by a lead 76 to the light contact 62, and a lead 77 to the light contacts 68 and 72, while the electromagnets 44 and 45 are connected by leads 78 and 79 to the left and right signal contacts 69 and 73. The battery contacts 63, 67 and 71 are connected by leads 80 and 81 to the battery.

The operation is as follows:

When it is desired to signal "stop", the foot-brake is depressed, moving the switch lever 58 into contact first with the horn contact, causing the horn to be sounded, and then into contact with the light contact, causing the lamp 54 to be lighted, thereby illuminating and rendering visible the "stop" faces of the drum, which as above pointed out are normally in place. In order to signal either "left" or "right" the lever 65 is thrown either to the left or right, as the case may be, first contacting with the horn contact to sound the horn, and then contacting with the light and magnet contacts, the latter causing the respective electromagnets 44 or 45, as the case may be to be energized to rotate the drum, and thereby bring the "right" or "left" arrow faces into view. Upon deenergization of the magnets the drum automatically returns to its normal position by gravity.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. In a signal device, a casing having a tail light compartment, a frame member slidably engaged in said casing above said tail light compartment and forming a signal compartment, a cover at the rear side of said casing having a bull's-eye in its lower portion and an opening in its upper portion, an audible signal device at the front side of said casing, tie-rods passing through said cover, casing, and engaging said audible signal device, adapted to secure said cover, casing and audible signal device together and secure said frame in said casing, a sign carrier in said frame having a series of signs, adapted to be exposed through said opening, and means adapted to be actuated to partially rotate said sign carrier in either direction to bring the signs in position at said opening.

2. In a signal device, a casing having a tail light compartment, a frame member slidably engaged in said casing above said tail light compartment and forming a signal compartment, a cover at the rear side of said casing having a bull's-eye in its lower portion and opening in its upper portion, tie-rods passing through said cover and casing adapted to secure said cover and casing together and secure said frame in said casing, and a sign carrier in said frame having a sign adapted to be exposed through said opening.

Signed at Bridgeport in the county of Fairfield and State of Connecticut this 14th day of March, A. D. 1924.

FRANK BALINT.